Figure 1:
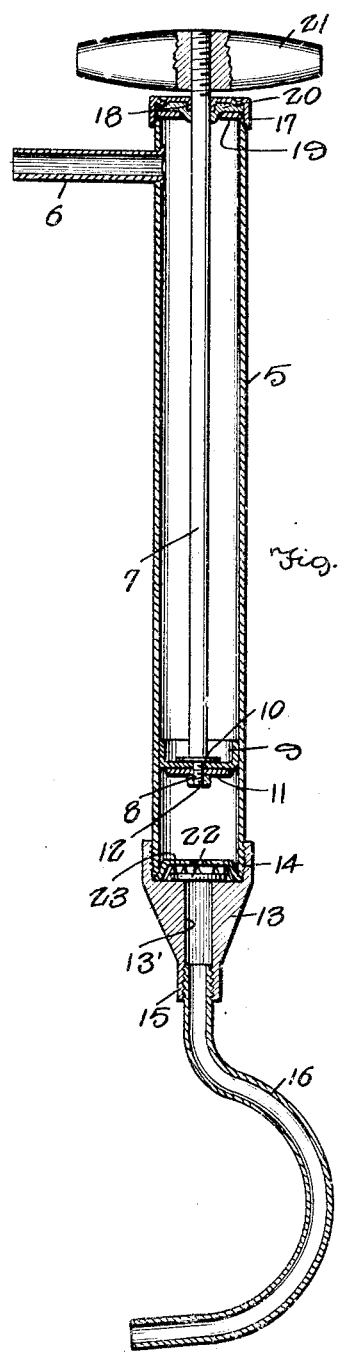

Jan. 31, 1928.

D. M. HESTON 1,657,469

GREASE PUMP

Filed Oct. 20, 1925

Darwin M. Heston, Inventor

By Richard B. Owen

Attorney

Witnesses

Patented Jan. 31, 1928.

1,657,469

UNITED STATES PATENT OFFICE.

DARWIN M. HESTON, OF EVANSVILLE, INDIANA.

GREASE PUMP.

Application filed October 20, 1925. Serial No. 63,741.

This invention relates to pumping apparatus and has for its prime object to provide a pump designed for the extraction of grease and similar matter from the reservoirs of internal combustion engines and the like.

A further object of the invention is the provision of a pump of the above character constructed so as to be operated with comparatively little effort.

Still a further object of the invention is the provision of a pump of a simple and durable nature formed so as to permit convenient removal of grease and like matter from the differential housing and like grease containing structures of automobiles and similar vehicles.

Another object of the invention is the provision of a pump of the above character which will operate efficiently and which may be placed upon the market at a comparatively low cost.

Other objects and advantages of this invention will become apparent as the description progresses.

Figure 2:
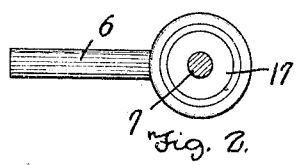
Figure 3:
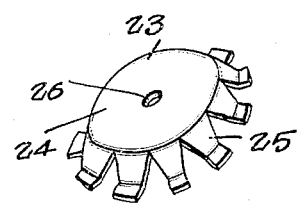

In the accompanying drawing forming a part of this specification and in which like reference characters are employed to designate corresponding parts throughout the same:

Figure 1 is a longitudinal sectional view through a pump structure conforming to my invention, Figure 2 is a top plan view of the same with the handle member removed, and Figure 3 is a perspective view of a valve casing forming a part of my invention.

In the drawing, wherein for the purpose of illustration is shown the preferred embodiment of my invention, the numeral 5 generally designates a tubular casing forming the cylinder of my improved pump, this casing being open at its extremities and externally screw threaded adjacent thereto. The upper portion of the cylinder 5 is provided with a circular opening to permit connection of an outlet tube 6, open at its extremities and secured to the cylinder so as to communicate with the interior thereof. It is readily apparent, that the outlet tube 6 is of substantially decreased diameter with reference to the cylinder 5, and the matter forced from the cylinder is conveyed into a suitable container through this tube.

Mounted so as to reciprocate in the customary manner in the cylinder 5 is a longitudinal piston rod 7 preferably of circular cross section externally screw threaded at its upper end and provided with a reduced screw threaded projecting pin 8 at its lower end. Secured to the lower end of the piston rod 7 in the usual way is a suitable piston structure embodying a packing ring 9 of substantially circular formation and provided with an upturned flange, this packing ring being preferably constructed of leather or similar material. Mounted above the packing ring 9 so as to abut the enlarged portion of the piston rod 7 is a washer 10 while an enlarged washer 11 of metallic construction is mounted in contact with the lower portion of the packing ring. These elements are tightly secured on the lower end of the piston by a nut 12 which is threadedly engaged with the reduced pin 8 and retains the packing ring 9 securely in position. This construction provides a piston of yieldable structure, the upturned flange of the packing ring 9 being adapted to tightly engage the sides of the cylinder on the upward stroke of the piston rod, but to contact appreciably on the downward stroke so that an annular recess is provided between the packing ring and the cylinder walls to permit the passage of matter thereby.

Threadedly mounted on the lower end of the cylinder 5 is a tapered connecting sleeve 13 provided at its upper end with an internally screw threaded flange 14 and an intermediate tapered body portion. The lower end of the sleeve is provided with a reduced nipple 15 internally screw threaded for engagement with a conducting tube 16. This conducting tube 16 may be of any desired construction preferably formed to assume a semi-circular curve, as shown in the drawing. This construction of the tube will permit the pump to be conveniently connected with the differential housing of a vehicle or other reservoir. The center of the connecting sleeve 13 is, of course, provided with a longitudinal bore 13' communicating with the interior of the cylinder, through which the grease or other matter is drawn through the intermediacy of the conducting tube 16.

The upper end of the cylinder 5 is enclosed by a flanged cap 17 threadedly engageable with the cylinder and provided with a central opening about which is formed an inwardly extending packing collar 18. As it is desirable to provide suitable packing at the upper end of the cylinder to prevent leakage of matter through the piston rod opening, an annular plate 19 is positioned on the upper end of the cylinder provided at its central portion with a comparatively large opening. Suitable packing 20 is mounted between the plate 19 and the cap 17, the packing ring 18 formed on the cap tending to force the packing through the opening formed in the plate 19 so as to tightly embrace the piston rod 7. In this connection, it will be noted that the piston rod carries on its upper end a conveniently formed handle 21 of conventional design by means of which the piston rod may be conveniently actuated.

From the foregoing construction, it will be readily noted that the piston rod 7 is longitudinally movable through the cylinder 5 and is of sufficient length to extend through the greater portions thereof.

In order that the grease or other matter may be efficiently pumped through the cylinder, the lower portion thereof is provided with a suitable valve structure embodying a disk valve 22 of metallic construction, arranged so as to normally rest on the upper portion of the connecting sleeve 13 and close the upper end of the bore therein. This valve is retained in position by means of a valve casing or cage 23 embodying a circular body plate 24 provided with outwardly flared tapered side ribs 25, the lower extremities of the ribs 25 being bent outwardly in a parallel plane with the body plate 24 so as to be firmly secured between the lower end of the cylinder 5 and the connecting sleeve. This structure provides a cage of perforated construction forming V-shaped recesses about the sides of the cage for the passage of grease or other matter being discharged through the pump. The center of the cage body plate 24 is provided with a comparatively small opening 26 so as to faciliate the operation of the valve.

In use, the conducting tube 16 of the pump structure is inserted through the opening in the differential housing or other grease containing reservoir and the piston 7 reciprocally operated. During the intake stroke, that is, while the piston is being elevated in the cylinder, the suction formed in the cylinder between the outlet end and the piston will cause the disk valve 22 to be raised so as to uncover the bore 13' formed in the connecting sleeve. The grease will then be drawn through this bore and through the valve cage into the cylinder and practically fill the cylinder. As the piston is urged on its return stroke into the cylinder, the packing ring 9 will contract so as to disengage the side walls of the cylinder and permit the passage of the matter thereabout. The grease is prevented from discharging outwardly through the conducting tube by the action of the disk valve 22 which will be forced tightly upon its seat so as to cover the bore 13' formed in the sleeve 13. It is therefore obvious, that the grease will be forced toward the discharge end of the cylinder and will issue through the outlet tube 6 into a suitable container. Repeated operation of the piston will quickly drain the grease container so that the old grease may be conveniently replaced with fresh lubricant. From the foregoing description, and the drawing, it will be readily seen that a comparatively simple and compact pump structure is provided, designed so as to be manufactured at a low cost and arranged so as to perform the lubricant draining operation quickly and efficiently.

It is to be understood that the form of my invention herewith shown and described is susceptible of modification and that various changes as to the shape, size and arrangement of parts may be resorted to without departing from the spirit of the invention or the scope of the subjoined claims.

Having thus described my invention, I claim:

1. A pump valve including a flat disk adapted to normally close the intake opening of a pump, and a guide cage including a circular body plate and a plurality of angularly arranged ribs adapted to provide supports for the body secured to the bottom of the pump and having apertures therein to permit the passage of matter therethrough.

2. In combination, a cylinder, an inlet sleeve threaded to one end of the cylinder, and a valve structure associated therewith including a valve retaining disk having spaced ribs, portions of which being clamped between said cylinder and sleeve.

In testimony whereof I affix my signature.

DARWIN M. HESTON.